United States Patent [19]

Fitzgibbons

[11] Patent Number: 4,709,726

[45] Date of Patent: Dec. 1, 1987

[54] HYDRAULIC COUPLER WITH FLOATING METAL SEAL

[75] Inventor: Michael R. Fitzgibbons, Houston, Tex.

[73] Assignee: Ferranti Subsea Systems, Inc., Sugar Land, Tex.

[21] Appl. No.: 15,797

[22] Filed: Feb. 17, 1987

[51] Int. Cl.$^4$ .............................................. F16L 29/00
[52] U.S. Cl. .............................. 137/614.04; 285/111; 277/27; 277/205
[58] Field of Search .............. 137/614, 614.03, 614.04; 285/100, 101, 111, 223, 224; 277/3, 27, 205, 206 R, 326

[56] References Cited

U.S. PATENT DOCUMENTS

| | | | |
|---|---|---|---|
| 2,265,267 | 12/1941 | Cowles | 285/111 X |
| 3,498,324 | 3/1970 | Bruining | 137/614.04 |
| 3,508,580 | 4/1970 | Snyder, Jr. | 137/614.04 |
| 4,602,806 | 7/1986 | Saliger | 277/27 X |

Primary Examiner—A. Michael Chambers
Assistant Examiner—John C. Fox
Attorney, Agent, or Firm—Norvell & Associates

[57] ABSTRACT

An improved hydraulic coupler suitable for interconnecting subsea fluid lines is provided with a highly reliable metallic seal between the male and female portions. A C-shaped metallic seal is radially compressed between the female and male coupler bodies, so that axial movement between these bodies does not effect sealing effectiveness. A floating retainer ring housed within the retrievable female body by a fixed retainer ring allows for radial misalignment between the coupling halves. The floating retainer ring thus becomes centered with respect to the male coupling body, while a metallic face seal provides sealing engagement between the floating and fixed retainers. Both axial and radial deviation between the coupling bodies is thus permissible, and the coupling can reliably seal fluid after repeated coupling and uncoupling operations.

20 Claims, 5 Drawing Figures

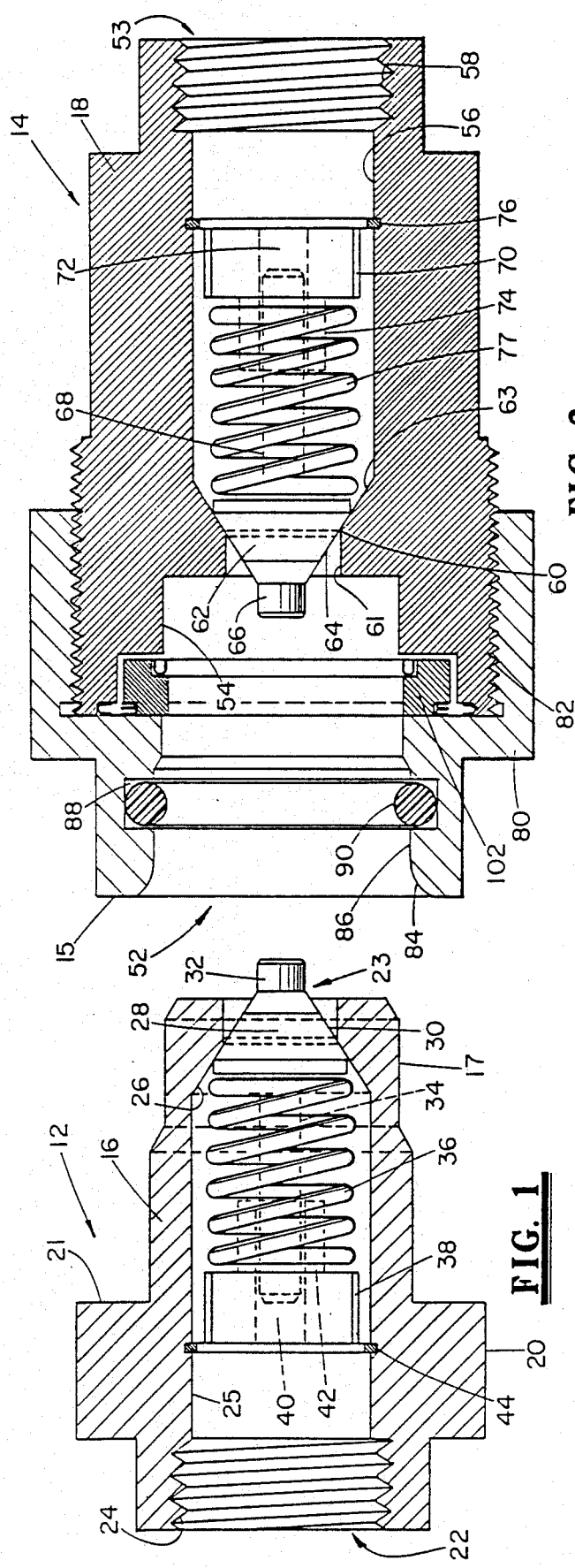
FIG. 2
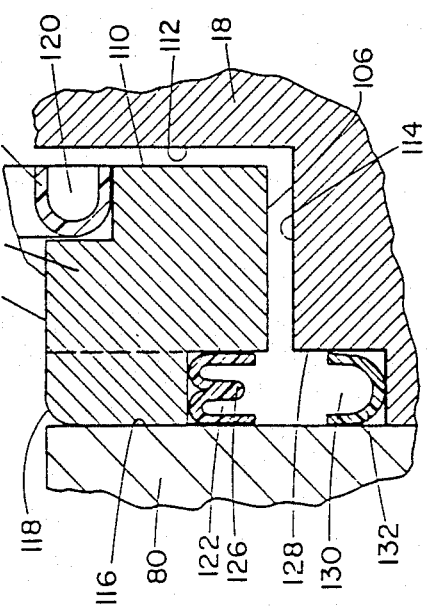
FIG. 4
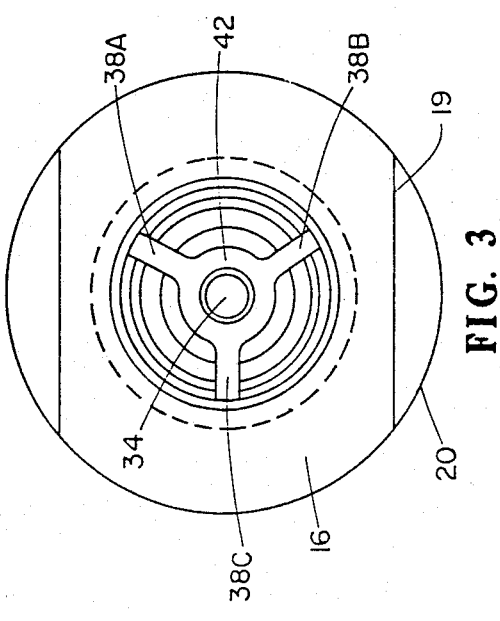
FIG. 5
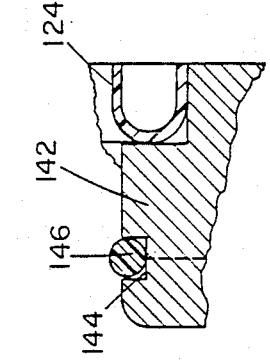
FIG. 1
FIG. 3

HYDRAULIC COUPLER WITH FLOATING METAL SEAL

BACKGROUND OF THE INVENTION

The present invention relates to a highly reliable male/female fluid coupling with an improved metallic seal for sealably maintaining fluid pressure after repeated mating and unmating operations and, more particularly, relates to an improved metallic seal coupling which allows for both axial and radial deviation between the coupling halves during the mating operation.

Conventional male/female couplings have long been used to sealingly join pressurized fluid lines. The coupling halves, when joined, automatically enable the fluid and/or fluid pressure to be transmitted through the coupling without a significant pressure differential. When unmated, the value stems in the body of each coupler half automatically seal the fluid within the coupler and its respective fluid line. Such couplers preferably are able to reliably maintain high fluid pressure after repeated mating and unmating operations.

The seal between the joined coupling halves may conventionally be provided by either an elastomeric or metallic member. The low cost, chemical inert quality and noncorrosive characteristics of elastomeric sealing materials has resulted in the commonplace use of such sealing members for many applications. Such elastomeric seals typically may be manufactured from natural or synthetic rubber, Teflon, nylon, PEEK, or similar materials.

In other applications, especially those wherein high reliability is paramount or the contained fluid is highly abrasive, metallic seals are preferable. One such application involves couplers commonly used in subsea petroleum recovery operations, wherein a plurality of coupler halves are mounted on respective control module mounting bases, so that clamping and unclamping of the bases mates and unmates the couplers and thereby interconnects numerous fluid pressure transmission lines.

One type of coupler suitable for reliably interconnecting fluid lines employs a metallic face seal. Sealing engagement is provided by a metallic seal sandwiched between surfaces of the coupler halves, with each sealing surface being generally perpendicular to the axis of the coupler. The metallic seal is permanently deformed into sealing engagement with each sealing surface by an axially directed mating force, and thus must be replaced between successive mating operations. A coupling with a reusable metallic radial seal is disclosed in U.S. patent application Ser. No. 908,593, hereby incorporated by reference.

One disadvantage of prior art metallic seal couplers is the expense and inherent decreased reliability associated with maintaining close tolerance between the sealing surfaces of the coupler halves. Close axial tolerances must be maintained between the surfaces for engagement with the face seal for the first coupler described above, and similarly close alignment or radial tolerance of the cylindrical surfaces for engagement with the radial seal is necessary for the second coupling described in U.S. patent application Ser. No. 908,593. These tolerance problems, although not particularly troublesome for many coupling operations, are particularly difficult and expensive to correct for remote coupling operations, such as petroleum subsea operations.

The disadvantages of the prior art are overcome by the present invention, and an improved coupler is hereinafter described with metallic seals positioned to allow for both axial and radial deviation between the coupling halves.

SUMMARY OF THE INVENTION

An improved highly reliable coupling for transmitting fluid pressure includes male and female body components, with reusable compressible seals for sealing fluids between the coupling halves when mated. A floating metallic ring is housed within the female body and is captivated by a fixed ring threaded to the female body. A first metallic radial seal is provided for engagement with a substantially cylindrical outer surface on the male body and a similarly configured inner surface on the floating ring. Axially "play" between the cylindrical surfaces does not detrimentally affect sealing reliability since the seal is a radial seal. Radial misalignment between the coupling halves is allowed since the floating retaining ring can move radially to center itself with respect to the male coupling body as the coupling is made up.

A second metallic face seal seals off the path between the floating retaining ring and the fixed retaining ring secured to the female body. Fluid pressure on the floating retaining ring compresses the second seal when the coupling is mated. Both the first and second seals are preferably fluid responsive, so that increased sealing effectiveness is obtained from increased fluid pressure across the seal. A third metallic seal seals off the path between the female body and the fixed retainer. The metal seals are preferably located on the retrievable female coupling to protect the seals during transport, and to enable the seals to be easily checked and replaced if necessary between successive sealing operations. Also, damage of the primary male/female seal is minimized, since the male component moves into the first seal rather than the seal moving into a female cavity. High reliability, reduced manufacturing costs, and low coupling force thus make the coupling of the present invention ideally suited for various remote environments requiring high-quality couplings.

In one suitable embodiment of the invention, the coupling halves are mounted in subsea control module mounting bases. These bases, when clamped together, typically function in part to transmit fluid and fluid pressure from the surface to various components of the subsea petroleum recovery module. When uncoupled, the coupling valve stems seal fluid within the respective coupling halves, and little if any fluid is lost to the environment. The coupling may also be employed in similar remote environments, such as subterranean petroleum recovery or outer space operations.

The present invention thus provides a highly reliable coupling with improved performance over prior art couplings. The features and advantages of the present invention will be more fully understood from the subsequent description, wherein reference is made to the figures in the following drawings.

BRIEF DESCRIPTION OF THE DRAWINGS

FIG. 1 is a side view, partially in cross-section, of the male coupling portion according to the present invention.

FIG. 2 is a side view, partially in cross-section, of the female coupling portion according to the present invention, including metallic seals.

FIG. 3 is a left-end view of the male component depicted in FIG. 1.

FIG. 4 is an exploded cross-sectional view of a portion of the female component shown in FIG. 2, including the metallic seals.

FIG. 5 is an alternate view of a portion of the apparatus shown in FIG. 4.

DETAILED DESCRIPTION OF THE PREFERRED EMBODIMENT

Male coupling half 12 in FIG. 1 and the female coupling half 14 in FIG. 2 are shown axially aligned for mated engagement. Male component 12 includes a generally cylindrical body 16 having an expanded portion 20 with surface 21 which may engage the end surface 15 of coupling half 14 during the coupling operation. Component 12 has a cylindrical passageway defined by inner cylindrical surface 25 having a central axis and interconnecting ports 22 and 23. The side walls adjacent port 22 are threaded at 24 for sealing with a suitable hose or line connection (not depicted).

The opposite end of coupling half 12 includes a conical surface 26 for metal-to-metal sealed engagement with a valve stem 28 which includes a similar conical end portion 30 and tip end 32. The valve stem 28 is biased for sealing engagement with surface 26 by coil spring 36, which is retained in place by retainer 38. Retainer 38 includes a central bore 40 for slidingly receiving portion 34 of stem 28. The sleeve-shaped portion 42 is adapted for fitting within the interior of spring 36. The retainer is held in place with respect to the body 16 by a conventional clip ring 44.

FIG. 3 depicts that expanded portion 20 includes planar exterior surfaces 19 which enable rotation of the male component with a conventional tool. Retainer 38 is comprised of three leg members 38A, 38B, and 38C, each having an outer end for engagement with the retainer ring 44 and joined at their radially inward ends to sleeve portion 42. The relatively close tolerance between the cylindrical portion 34 of valve stem 28 and the interior of sleeve portion 42 is depicted in FIG. 3. A right-end view of the female coupling half 14 would be similar to FIG. 3.

FIG. 2 depicts female half 14 including a body 18 with a cylindrical configuration. Body 18 may also include two or more planar surfaces (not shown) for enabling rotation of the body 18 with a conventional tool. A central passageway defined by cylindrical surface 56 having an axis aligned with the axis of the passageway of male member 12 interconnects ports 52 and 53. The female component passageway includes a large diameter, male body receiving portion bounded by cylindrical wall 54, a sealing portion bounded by conical surface 60, and a threaded end portion formed by threads 58. Valve stem 62 is biased by spring 77 and includes a conical sealing surface 64, tip end 66, and cylindrical portion 68 similar to the components previously described. Conical surface 64 of the valve stem is thus adapted for sealing engagement with edge surface 60 formed by the intersection of cylindrical surface 61 and conical surface 63. A retainer 70, having a bore 72 and a sleeve 74, are retained by clip ring 76, as previously described.

A fixed retaining ring 80 is threadably connected to body 18 at threads 82, and captivates a metallic floating ring 102 within the female coupling half 14. A cylindrical inner surface 86 of retaining ring 80 has a slightly larger diameter than inner surface 54 for initially receiving the end of the male coupling half 12, and the inner edge 84 of ring 80 is accordingly rounded. A circular recess 88 having a retangular cross-sectional configuration is provided in fixed ring 80 for housing an elastomeric o-ring 90, which serves as a bumper to partially guide the outer surface 17 of the male component 12 as the coupling is mated.

Referring now to FIGS. 2 and 4, the coupling of the present invention includes a floating metallic ring 102 which may move radially and, preferably, both radially and axially, with respect to body 18 of the female coupling. The ring 102 has a generally rectangular cross-sectional configuration, and includes an inner cylindrical surface 104, an outer cylindrical surface 106, face surface 116 for engagement with the fixed retaining ring 80 when the coupling is mated, and face surface 110 for engagement with body 18 when the coupling is unmated. The axial length of the floating ring 102 is intentionally less than the annular groove provided between the body 18 and the fixed ring 80, so that a gap of; e.g., from 0.008 inch to 0.020 inch (for a nominal 2-inch coupler), exists between the face surface 110 and surface 112 when the floating ring is moved into engagement with the fixed ring. Similarly, the outer diameter of the floating ring 102 for this coupler may typically be from 0.060 inch to 0.080 inch less than the internal diameter of cylindrical surface 114 of the body 18, so that the ring can axially "float" or move off center with respect to body 18, and thereby become axially aligned with the male body 16.

An inner rectangular-shaped groove 120 is formed in the floating ring 102, and a similar recess 122 is formed in the diametrically opposite corner of the floating ring. A metallic C-ring 132 is positioned in recess 120 for providing sealing engagement between the floating ring 102 and the male coupling half. A metallic E-ring 126 in recess 122 similarly provides a seal between the floating and the fixed ring 80. A third metallic seal, such as C-ring 132, is provided in the rectangular-shaped recess 130 for providing a static seal between the body 18 and the fixed ring 80. The leading inner edge of ring 102 may be rounded at 118 to facilitate alignment of the male body 16 and the floating ring as described subsequently.

When uncoupled, the valve stems seal with the metal body of the coupling halves to seal fluid within each coupling half and its respective fluid line. As the coupling halves are mated, the male component may be partially guided for concentric engagement with the female component by bumper 90. Floating ring 102 may then become aligned with the male body 16; i.e., the ring 102 may move radially out of alignment with body 18 and become aligned with body 16 as the male coupling half is inserted into the female coupling half. As the male body is further inserted into the female receptacle, the metal C-ring 124 forms a radial seal between the floating ring and the male body 16. Since this is a radial seal, axial dimensions of the male body with respect to the female body are not critical, form a suitable sealing surface.

Further insertion of the male body into the female receptacle will cause the tip ends 32 and 66 to engage, thereby compressing springs 36 and 77 and unseating the valve seats from the metal sealing surface of the respective bodies. As the poppets each unseat from their metal sealing surface, fluid pressure immediately acts on the C-seal 124 to bias its legs outwardly and thereby increase sealing effectiveness of the metal seal. Simultaneously, fluid pressure acting on surface 110 forces the floating ring 102 toward the male component, so that surface 108 engages the fixed ring 80. Fluid pressure also simultaneously acts upon the E-seal 122 to increase the sealing effectiveness between the floating ring and the fixed ring. Finally, this increased fluid pressures increases the sealing effectiveness of C-seal 132 between the fixed ring 80 and the body 18. Once fully coupled together, fluid and fluid pressure may thus pass through the coupling, and seals 124 and 126 each housed on the floating ring together form the fluid-tight connection between the female body (and the fixed ring secured thereto) and the male body, while static seal 132 provides the seal between the fixed ring and the female body.

One disadvantage of the embodiment shown in FIG. 2 is that bumper ring 90 cannot effectively function as a wiper or back-up seal with surface 17. Retaining ring 80 is generally not going to be axially aligned with the male body 16 when the coupling is mated, and thus bumper 90 may not wipe clean a portion of surface 17. Moreover, alignment of sealing components is preferably achieved at least substantially by the concept of a floating ring 102, and bumper 90 somewhat defeats the objective of reducing the required mating force of the coupling halves if bumper 90 must be partially compressed and resists mating of the coupling due to high frictional engagement with surface 17 during the mating operation. Accordingly, it may be desirable to eliminate bumper ring 90, so that surface 17 would not be wiped before sealing engagement with seal 124. With ring 90 eliminated, however, nothing would restrict the ability of the floating ring to align itself for sealing engagement with the male component.

The above disadvantage may, however, also be overcome with the embodiment shown in FIG. 5, wherein an elastomeric O-ring 146 is mounted in groove 144 of the modified floating ring 142. O-ring 146 serves as an effective wiper to clean surface 17 and also provides a back-up fluid-tight seal between the floating ring 142 and the male coupling half. Since the floating ring may become axially aligned with the male body during the coupling mating operation, the wiper seal ring 146 mounted on the floating ring 142 can effectively function as both a wiper and a back-up seal, yet not significantly increase the frictional force required to bring the two coupling halves together.

As previously stated, each of the seals housed on the floating ring 102 are metallic, fluid-responsive, compressible seals. Metallic seal rings are commercially available in C-, E-, W-, O- and U-configurations, with the perferred configuration for each particular situation depending on the fluid, the fluid pressure, the pressure differential across the coupling, cost, and tolerance of the components. Such metallic seals are available in various noncorrosive, spring-like materials such as Inconel X-750. Also, such compressible metallic seals are available in various sizes for axial and face applications and are further available at various tolerances depending upon the anticipated internal and/or external pressure ranges.

C-ring 124 could thus be replaced with a metallic seal having an E-, W-, or V- configuration, with each seal still being responsive to fluid pressure to increase sealing effectiveness. Seal 132 could similarly be formed in such designs or, being a static seal, could even be a metallic ring having an O- cross-sectional configuration or a conventional 37-degree angled metallic seal of the type commonly used in hydraulic hose fittings and approved by the Joint Industrial Council. Metallic seal 126 could also be of the C-, W-, or V- configurations, although the E- or W- configurations are preferable to minimize drag on the floating seal as it becomes axially aligned with the male body. In other words, prior to coupling, the biasing force of seal 126 typically acts to press surfaces 110 and 112 together, with the outer legs of the seal 126 nevertheless forming a seal between the floating ring and the fixed ring. This biasing force of the seal will, however, be quite nominal, so that very little resistance force or drag must be overcome as the floating ring moves to become axially aligned with the male body during the coupling operation. Once axially aligned, the increased fluid pressure will thereafter cause the seal 126 to become compressed as the floating ring moves into engagement with the fixed ring, as described above. This additional compressive force on the seal 126, coupled with fluid pressure acting on the seal, substantially increases the sealing effectiveness of the seal 126 after it has become aligned with the male body. The E- and W- configurations for metallic seals are thus preferable for the seal 126 in that these designs are able to maintain limited sealing effectiveness when in the uncompressed state, yet reliably seal when in a more compressed state while also being responsive to fluid pressure to increase sealing effectiveness.

In a typical subsea petroleum recovery operation, a large number; e.g., from 8 to 30, coupling halves are each mounted on a corresponding control module mounting base. When the mounting bases are clamped together, the coupling halves are mated and the respective fluid lines interconnected without loss of fluid or fluid pressure. When unmated, the coupling halves hold fluid and fluid pressure within the internal passageway of each coupling half and its respective interconnected lines. Mating and unmating of couplings results in little, if any, loss of fluid to the environment. Proper alignment of the male and female mounting base in this remote environment is, of course, extremely difficult. The numerous coupling halves are simultaneously coupled when the mounting bases come together, so that all the coupling half bodies in each of the mounting bases must be properly aligned, or the bases cannot be mated. According to the prior art, the coupling halves are therefore often aligned only after considerable time and expense, and occasionally the coupling halves could not be aligned and one of the mounting bases had to be returned to the surface for further adjustments of the position of one or more of the coupling halves.

To alleviate this problem, coupling bodies have been nonrigidly mounted on module bases, so that "float"or "play" between the rigid base and each of the coupling bodies was possible. Although this technique alleviated some of the problems associated with axial alignment of the coupling bodies, further problems were presented since the coupling halves frequently must be connected in a fluid-tight manner to the control module bases so that another fluid could not escape from the control module.

The techniques of the present invention overcome this problem by providing a coupling with the floating ring as described above, whereby the floating ring can move radially to become aligned with the male component and out of alignment with the female component, yet the radially moveable seals positioned on the floating ring may effectively seal against both the male component and the fixed ring of the female component when the coupling is mated. Accordingly, each of the coupling bodies 16 and 18 may be rigidly mounted to a suitable control module mounting base. Precise axial alignment of the bodies 16 and 18 is thus not required in order to obtain a reliable coupling, with the floating ring and the metallic seals forming the necessary fluid-type seal. Accordingly, the exterior of the coupling body could be provided with suitable securing means, such as external threads, for rigidly attaching each coupling body to a fixed module base.

It should be understood that the cost of the couplings used in remote operations, such as that described above, are insignificant compared to the cost of labor, equipment, and delay associated with repair operations should the coupling not properly mate or should the mated coupling leak. Also, a fluid loss from the mated coupling could result in the absence of controlled pressure to subsea equipment, thereby jeopardizing the safety of the entire hydrocarbon recovery operation. Accordingly, utmost physical mating and sealing reliability of the couplings is critical to the present invention.

A further advantage of a coupling according to the present invention compared to prior art couplings having metallic face seals relates to the force required to mate coupling halves together, since each of the mounting bases may each contain dozens of coupling halves and the force for mating the bases is multiplied by the number of couplings. As those skilled in subsea operations understand, the cost of applying the necessary coupling force for mating couplings in surface coupling operations is minor compared to the cost of mating couplings in subsea operations. By allowing the floating ring to easily float and become axially aligned with the male coupling, and thereafter compressing the fluid-responsive fixed ring seal, the necessary mating force is substantially reduced. The lower cost of subsea equipment capable of mating couplings according to the present invention is thus directly related to the reduced force required to mate the coupling halves.

Although the invention has been particularly described in the environment of surface or subsea petroleum recovery operations, it should be understood that a coupling of the type described herein may be used in various applications. In particular, the primary benefits of high reliability (both in terms of mating and sealing efficiency) and reduced axially directed coupling force render the coupling particularly well suited for remote operations. The coupling herein described would thus be well suited for use in subterranean operations, in medical equipment and techniques, and in outer space applications.

Various modifications of the embodiment described above should be apparent. For example, the ends of the coupling may be adopted for welded engagement with pipe or tubing, rather than having threads as shown in the figures. The valve stems, valve bodies, and/or only their sealing surfaces could be fabricated from high strength plastic or ceramic material, rather than metal. Set screws or other removable retaining means may be used instead of the clip rings.

Although the invention has been described in terms of the specified embodiments which are set forth in detail, it should be understood that this is by illustration only and that the invention is not necessarily limited thereto, since additional alternative embodiments and operating techniques will become apparent to those skilled in the are in view of the disclosure. Accordingly, further modifications are contemplated which can be made without departing from the spirit of the described invention.

What is claimed and desired to be secured by Letters Patent is:

1. In a hydraulic coupling of the type employing male and female coupling bodies each having a fluid passageway therethrough for the transmission of fluid, each coupling body including a metallic sealing surface for sealing engagement when the coupling is unmated with a valve stem movably mounted within the respective coupling passageway, the valve stems within each coupling body having tip ends adapted for engagement when the coupling is mated for unsealing each valve stem from its respective metallic sealing surface within the coupling body and thereby allowing the transmission of fluid through the mated coupling, the improvement comprising:

the male coupling body including a cylindrical outer metal surface;

a floating metallic ring member housed within the female coupling body and both axially and radially movable with respect to the female body;

a fixed retainer ring securely connected to the male receiving end of the female body for retaining the floating metallic ring member within the female body;

a first compressible metallic-material seal ring housed on the floating metallic ring member for sealing engagement between the cylindrical outer surface of the male coupling body and the floating ring member for sealing the coupling bodies when mated;

a second compressible metallic-material seal ring housed on the floating metallic ring member for sealing engagement between the fixed retainer ring and the floating metallic ring for sealing the coupling bodies when mated; and the second metallic seal ring biasing the floating metallic ring member out of engagement with the fixed retainer ring prior to mating of the coupling bodies to facilitate alignment of the male coupling body and the floating metallic ring during the coupling operation, and the fluid pressure in the mated coupling biasing the floating metallic ring toward the fixed retaining ring to enhance sealing effectiveness of the second seal ring when the coupling is mated.

2. The improvement as defined in claim 1, wherein the floating metallic ring includes a cylindrical inner metal surface for sealing engagement with the first seal ring.

3. The improvement as defined in claim 1, wherein the second compressible seal ring seals between respective planar surfaces on the fixed ring member and the floating ring member, each planar surface being substantially perpendicular to the axis of the coupling.

4. The improvement as defined in claim 1, further comprising:

a third metal seal ring for sealing engagement between the fixed retaining ring and the female body.

5. The improvement as defined in claim 4, wherein each of the first, second, and third seals are carried on the female body portion.

6. The improvement as defined in claim 1, wherein each of the first and second seal rings have a cross-sectional configuration defining a central bore open to fluid pressure when the coupling is mated to increase sealing effectiveness.

7. The improvement as defined in claim 1, further comprising:
a ring-shaped elastomeric wiper seal mounted on the floating ring member for wiping the cylindrical outer surface of the male coupling body while the coupling is being mated and for sealing between the outer surface and the floating ring member.

8. The improvement as defined in claim 1, further comprising:
the valve stem of each coupling body including a cone-shaped portion for sealing engagement with the metallic sealing surface of each coupling body; and
biasing means within each coupling body for biasing the valve stem toward sealing engagement with the metallic sealing surface of the coupling body.

9. The improvement as defined in claim 1, wherein:
the first seal ring has a C-cross-sectional configuration; and
the second seal ring has an E- or W-cross-sectional configuration.

10. The improvement as defined ih claim 1, wherein each of the body portions are adapted for fixed engagement with a mounting plate.

11. In a hydraulic coupling of a type employing male and female coupling bodies each having a fluid passageway therethrough for the transmission of fluid and including a sealing surface for sealing engagement when the coupling is unmated with a valve means movably mounted within the respective passageway of each coupling body, the female coupling body having a fluid input end and an opposing male receiving end, the valve means within each coupling body having end portions adapted for engagement when the coupling bodies are mated for unseating each valve means from its respective sealing surface for allowing the transmission of fluid through the mated coupling, the improvement comprising:
the male coupling body including a cylindrical outer sealing surface;
a floating ring member housed within the female coupling body and radially movable with respect to the female coupling body;
a first compressible metallic-material seal ring housed on the floating ring member for sealing engagement between the cylindrical outer surface of the male coupling body and a sealing surface on the ring member, the first seal in cross-section having an opening facing the fluid input end of the female coupling body to increase sealing effectiveness of the first seal ring;
a second compressible metallic-material seal ring housed on the floating ring for sealing engagement between a planar sealing surface of the female coupling body substantially perpendicular to the axis of the coupling and another sealing surface on the ring member, the second seal in cross-section having an opening facing radially outwardly to increase sealing effectiveness of the second seal ring; and
the second metallic seal ring biasing the floating metallic ring out of engagement with the sealing surface of the female coupling body prior to mating of the coupling bodies to facilitate alignment of the male coupling body and the floating metallic ring during the coupling operation, and fluid pressure in the mated coupling biasing the floating metallic ring toward the planar sealing surface of the female coupling body to enhance sealing effectiveness of the second seal ring when the coupling is mated.

12. The improvement as defined in claim 11, wherein the sealing surface on the floating metallic ring is a cylindrical inner metal surface for sealing engagement with the first seal ring, and the another sealing surface on the metallic ring is substantially parallel to the planar surface of the female coupling body.

13. The improvement as defined in claim 11, further comprising:
a fixed retaining ring secured to the female coupling body for housing the floating ring member; and
a third metal seal ring for sealing engagement between the fixed retaining ring and the female body.

14. The improvement as defined in claim 13, wherein each of the first, second, and third seals are carried on the female coupling body.

15. The improvement as defined in claim 11, further comprising:
the valve means of each coupling body including a cone-shaped portion for sealing engagement with the sealing surface of each coupling body;
biasing means within each coupling body for biasing the valve means toward sealing engagement with the sealing surface of each coupling body.

16. A method for sealingly mating a hydraulic coupling of a type employing male and female coupling bodies each having a fluid passageway therethrough for the transmission of fluid, the female coupling body having a fluid input end and an opposing male receiving end, each coupling body including a metal sealing surface for sealing engagement when the coupling is unmated with a valve means movably mounted within the respective passageway of each body, the valve means of each coupling body having tip ends adapted for engagement when the coupling bodies are mated for unsealing each valve means from its respective sealing surface in the coupling body for allowing the transmission of fluid through the mated coupling, and the male coupling body including a cylindrical outer sealing surface, the method comprising:
housing a floating metallic ring member within the female coupling body and movable both radially and axially with respect to the female coupling body;
mounting a first compressible metallic-material seal ring on the floating metallic ring member for sealing engagement between the cylindrical outer surface of the male coupling body and the floating ring member when the coupling is mated;
positioning an opening in the first seal ring facing the fluid input end at the female coupling body to increase sealing effectiveness of the first seal ring by exposing fluid pressure in the mated coupler to the interior of the first seal ring;
mounting a second compressible metallic-material seal ring on the floating ring member for sealing between the floating metallic ring member and a planar sealing surface of the female coupling body substantially perpendicular to the axis of the coupling;
positioning an opening in the second seal ring facing radially outwardly to increase the sealing effectiveness of the second seal ring by exposing fluid pressure in the mated coupler to the interior of the second seal ring;

biasing the floating metallic ring out of engagement with the planar sealing surface of the female coupling body prior to mating of the coupling bodies to facilitate alignment of the male coupling body and the floating metallic ring during the coupling operation; and mating the coupler to unseat the valve means from the metal sealing surface of each coupling body and exposing fluid pressure in the mated coupling to bias the floating metallic ring member toward the male receiving end of the female coupling body to enhance the sealing effectiveness of the second seal ring.

17. The method as defined in claim 16, further comprising:

mounting a ring-shaped elastomeric wiper seal on the floating ring member for wiping the cylindrical outer surface of the male coupling body while the coupling is being mated and for sealing between the outer surface and the floating ring member.

18. The method as defined in claim 16, further comprising:

providing a substantially cylindrical inner surface on the floating ring member for sealing engagement with the first seal ring; and providing a planar sealing surface on the floating ring member substantially perpendicular to the axis of the coupling for sealing engagement with the second seal ring.

19. The method as defined in claim 16, further comprising:

theading a securing ring member to the female coupling body to house the floating ring member within the female coupling body; and providing a third seal ring for sealing engagement between the female coupling body and the securing ring.

20. The method as defined in claim 18, wherein the floating metallic ring member has a substantially rectangular cross-sectional configuration, the first seal ring is mounted on an inner fluid input end of the ring member, and the second seal ring is mounted on an outer male receiving end of the ring member.

* * * * *